(12) United States Patent
Froelich et al.

(10) Patent No.: US 8,619,585 B2
(45) Date of Patent: Dec. 31, 2013

(54) DETERMINING LINK COSTS

(75) Inventors: Stephen F Froelich, Corvallis, OR (US); Lloyd E Wright, Albany, OR (US); Michael J Uppendahl, Salem, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 342 days.

(21) Appl. No.: 13/006,131

(22) Filed: Jan. 13, 2011

(65) Prior Publication Data

US 2011/0110264 A1  May 12, 2011

Related U.S. Application Data

(63) Continuation of application No. 11/917,649, filed on Sep. 26, 2008, now Pat. No. 7,907,530.

(51) Int. Cl.
*H04L 12/28* (2006.01)
(52) U.S. Cl.
USPC .................................. 370/238.1; 709/241
(58) Field of Classification Search
None
See application file for complete search history.

(56) References Cited

U.S. PATENT DOCUMENTS

| | | | |
|---|---|---|---|
| 6,122,514 A | 9/2000 | Spaur et al. | |
| 6,633,544 B1 | 10/2003 | Rexford et al. | |
| 6,658,479 B1 * | 12/2003 | Zaumen et al. | 709/238 |
| 6,762,997 B1 | 7/2004 | Liu et al. | |
| 7,161,957 B2 * | 1/2007 | Wang et al. | 370/468 |
| 7,500,013 B2 * | 3/2009 | Dziong et al. | 709/238 |
| 7,526,570 B2 * | 4/2009 | Rooholamini et al. | 709/241 |
| 7,698,460 B2 | 4/2010 | Zhang et al. | |
| 2004/0233850 A1 | 11/2004 | Randriamasy et al. | |
| 2005/0265359 A1 | 12/2005 | Drew et al. | |
| 2006/0050635 A1 | 3/2006 | Yamada et al. | |
| 2006/0080463 A1 | 4/2006 | Drew et al. | |
| 2006/0250965 A1 | 11/2006 | Irwin | |
| 2007/0025254 A1 | 2/2007 | Raciborski et al. | |
| 2007/0230363 A1 * | 10/2007 | Buskens et al. | 370/252 |

OTHER PUBLICATIONS

EPO, Examination Report dated Nov. 16, 2012, EP Pat App No. 07842888.5 filed Jan. 25, 2008.
Cisco IGRP Metric, http://www.cisco.com/warp/public/103/3.html, Aug. 10, 2005.
Fedyk, et al, Multiple Metrics for Traffic Engineering with IS-IS and OSPF, http://tools.ietf.org/html/draft-fedyk-isis-ospf-te-metrics-01, Nov. 2000.
International Standard ISO/IEC 10589, http://standards.iso.org/ittf/PubliclyAvailableStandards/c030932_ISO_IEC_10589_2002(E) Nov. 15, 2002.
The International Search Report and the Written Opinion of the International Searching Authority for Intn'l App No. PCT/US2007/079049 dated Jun. 6, 2008, pp. 10.

* cited by examiner

*Primary Examiner* — Alex Skripnikov

(57) ABSTRACT

Embodiments of a system with a first network device and at least first and second links connecting the first network device and one or more other network devices are disclosed. The first network device determines the costs of the first and the second links using the latencies of the first and the second links and factors that correspond to the bandwidths of the first and the second links.

19 Claims, 2 Drawing Sheets

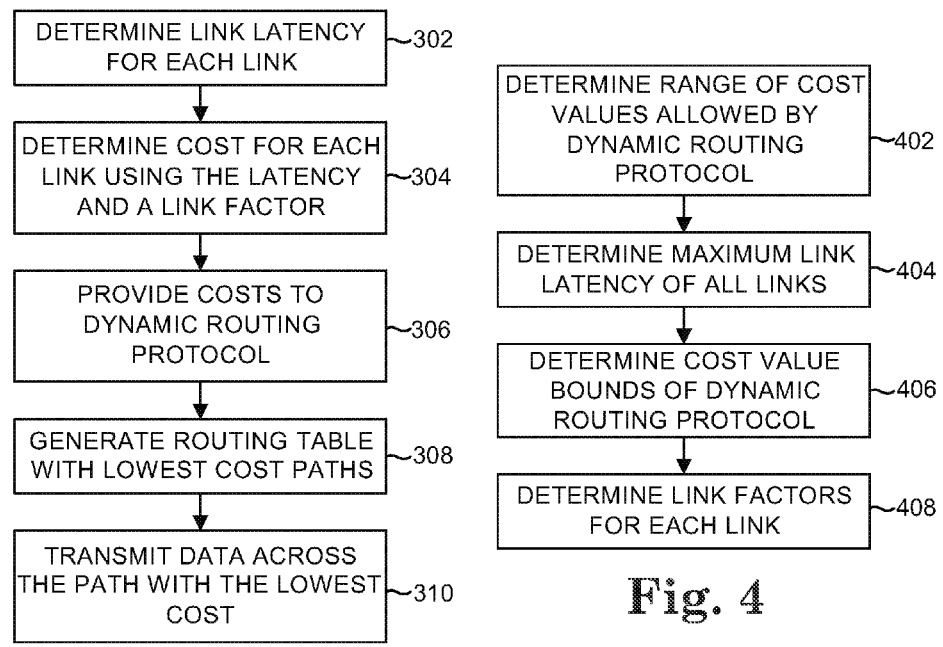

DETERMINING LINK COSTS

CROSS-REFERENCE TO RELATED APPLICATION

This application claims priority to and is a continuation of U.S. patent application Ser. No. 11/917,649 filed Sep. 26, 2008, now U.S. Pat. No. 7,907,530 entitled "Determining Link Costs," the entirety of which is incorporated herein by reference.

BACKGROUND

Communication networks may include communications paths between network devices that have different properties, such as capacities and latencies, for transmitting data between the devices. To transmit data as efficiently as possible between network devices in a network, network devices often consider various capabilities of the communication paths. These considerations, however, can quickly become overly complex and difficult to implement and may have the unintended effect of making the network operate less efficiently. To avoid this possibility, a routing scheme that involves simple, straightforward, and consistent application of routing preferences by network devices would be desirable.

BRIEF DESCRIPTION OF THE DRAWINGS

FIGS. 2A-2B are tables illustrating embodiments of link factors.

FIG. 3 is a flow chart illustrating an embodiment of a method for transmitting data across a lowest cost communications path.

FIG. 4 is a flow chart illustrating an embodiment of a method for determining link factors for communications links.

DETAILED DESCRIPTION

In the following detailed description, reference is made to the accompanying drawings, which form a part hereof, and in which is shown by way of illustration specific embodiments in which the disclosed subject matter may be practiced. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

According to one embodiment, a communications network with network devices is provided. The network devices are configured to transmit data, such as media data, on communications paths with the lowest costs where each path includes one or more communication links. The cost of each link in each path is determined from the latency of the link and a factor that is inversely related to the bandwidth of the link. The cost of each path is determined from the costs of each link in the path.

Figure 1A:
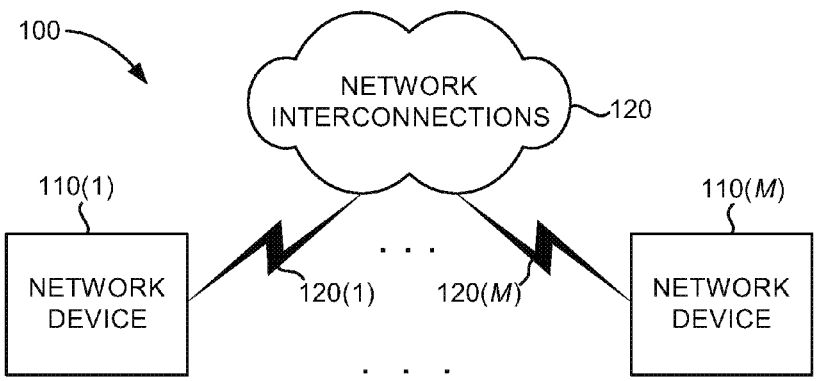
FIGS. 1A-1C are block diagrams illustrating an embodiment of a communications network with network devices connected with network interconnections.
Figure 1B:
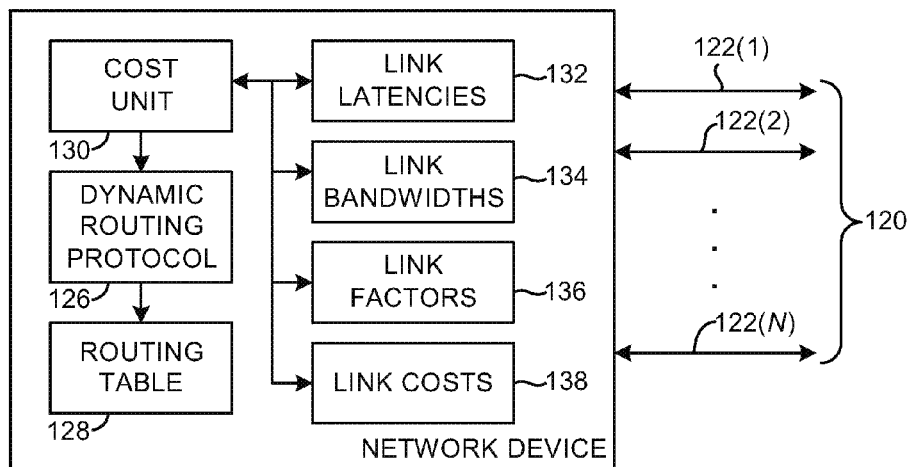
Figure 1C:
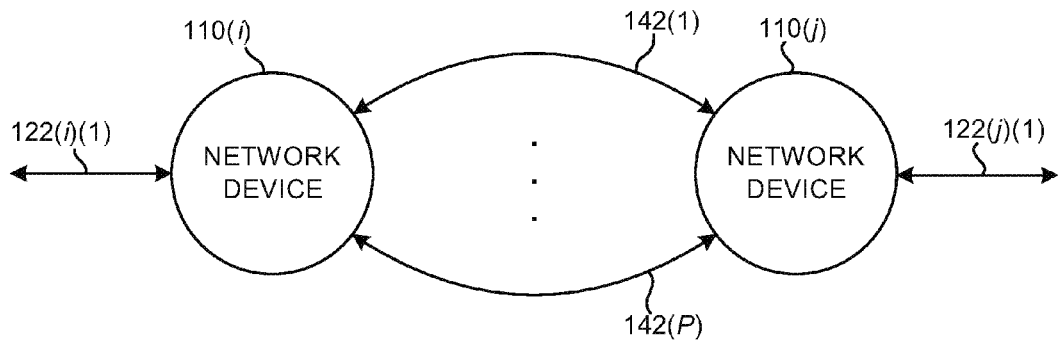

FIGS. 1A-1C are block diagrams illustrating an embodiment of a communications network 100 with network devices 110(1)-110(M), where M is greater than or equal to two, connected with network interconnections 120.

Referring to FIG. 1A, network interconnections 120 include sets of communication links 120(1)-120(M) that connect network devices 110(1)-110(M), respectively, to network 100. Each set of communication links 120 includes communication links 122 (shown in FIG. 1B) that connect each network device 110 with other network devices 110.

Network 100 includes any suitable type and number of network devices 110 with any suitable type and number of communications links 122 connected to each network device 110. Network devices 110 may be grouped or arranged into any suitable network configuration. The network configuration may include one or more local area networks (LANs) and/or one or more wide area networks (WANs), for example, that may be locally, regionally, or globally distributed. Each network device 110 may be located in close proximity to one or more other network devices 110 and/or remotely located from one or more other network devices 110.

Network devices 110 are each configured to communicate with other network devices 110 and/or data processing systems (not shown). Each network device 110 receives data from a network device 110 and/or a data processing system over a communication link 120 and transmits the data to at least one other network device 110 and/or at least one data processing system over another communication link 120. Each network device 110 may be any suitable type of network device configured to communicate with data processing systems or other network devices 110. Examples of a network device include a wired or wireless network component in a data processing system (e.g., an audio/visual (A/V) device, a portable or non-portable computer system, a personal digital assistant (PDA), a mobile telephone, a printer, or a scanner), a router, a switch, a gateway, a firewall, and a bridge.

In one embodiment, the data that is transmitted and received by network devices 110 may be latency sensitive, constant bandwidth data streams that include audio and/or video (A/V) media exchanged between two or more video conference sites (not shown) connected to network 100. In other embodiments, the data may be any other suitable type of data.

Referring to FIG. 1B, each set of communication links 120 includes communication links 122(1)-122(N) where N is greater than or equal to one and may be the same or different for each network device 110. Each link 122 may be any suitable wired or wireless transmission link that allows communication between connected network devices 110 and/or data processing systems. Each link 122 may be formed from any suitable transmission medium (e.g., optical fiber, copper, and free space) and may transmit data using any suitable transmission protocol. In one embodiment, each link 122 is an optical link over fiber or free space configured to transmit light signals between network devices 110. In other embodiments, each link 122 includes any suitable combination of one or more wired and/or wireless links configured to transmit electromagnetic signals between network devices 110.

Each link 122 has a bandwidth that describes how much data may be transmitted between connected network devices 110 over a time period and a latency that describes the amount of time to transfer data between connected network devices 110. The latency of each link 122 may depend on a physical distance between the connected network devices 110. For example, links 122 that span longer physical distances between connected network devices 110 may generally have longer latencies than links 122 that span shorter physical distances between connected network devices 110.

Network devices 110 each implement a dynamic routing protocol 126 that generates a routing table 128 or other suitable routing information that is used to route data through network 100. With a dynamic routing protocol, network devices 110 provide information about network 100 to other network devices 110. The information includes link costs 138 determined by a cost unit 130 for links 122. Routing protocol 126 generates routing table 128 from the costs 138 and other exchanged information and uses routing table 128 to efficiently route data through network 100. In one embodiment, network devices 110 implement the Open Shortest Path First (OSPF) protocol. In other embodiments, network devices 110 implement other dynamic routing protocols.

Network devices 110 each include a cost unit 130 that is configured to determine link costs 138 of links 122 from link latencies 132 and link factors 136 that correspond to link bandwidths 134 of links 122. To determine respective costs 138 of respective links 122, cost unit 130 applies respective factors 136 to respective latencies 132 using any suitable function, such as a multiplicative or additive function. Link factors 136 are inversely related to bandwidths 134 so that the determined costs favor bandwidths 134 over latencies 132 to a point but begin to favor latencies 132 over bandwidths 134 after the point.

FIG. 2A is a table illustrating an embodiment of a set of link factors 136 for various links 122 for a network device 110 in a wide area network (WAN) configuration. In the table of FIG. 2A, link bandwidths range from 45 Mbps (e.g., a T3 link) with a link factor 136 of 500 to 10 Gbps (e.g., an OC-192 (Optical Carrier) link) with a link factor 136 of 1. In the embodiment of FIG. 2A, link factors 136 are inversely and exponentially related to bandwidths 134. In addition, a first subset of the set of factors 136 (e.g., the factors 136 corresponding to the 622 Mbps, 1 Gbps, 2.4 Gbps, and 10 Gbps bandwidths) causes a first subset of the set of costs 138 to favor respective bandwidths 134 over respective latencies 132 of respective links 122. A second subset of the set of factors 136 (e.g., the factors 136 corresponding to the 45 Mbps and 155 Mbps bandwidths) causes a second subset of the set of costs 138 to favor respective latencies 132 over respective bandwidths 134 of respective links 122. The first and the second subsets of the set of factors 136 are mutually exclusive (i.e., the first and the second subsets do not include any of the same factors 136 for a given bandwidth).

FIG. 2B is a table illustrating another embodiment of link factors for various links 122 for a network device 110 in one of two local area network (LAN) configurations. In a first type of LAN configuration (i.e., LAN1) where network device 110 is configured as a relay router that connects to another network device 110 configured as a relay router, link bandwidths include a 1 Gbps (e.g., a 1 Gbps Ethernet link) with a link factor 136 of 5 and a 10 Gbps (e.g., 10 Gbps Ethernet link) with a link factor 136 of 3. In a second type of LAN configuration (i.e., LAN2) where network device 110 is configured as a relay router that connects to another network device 110 configured as a collector router, link bandwidths include a 1 Gbps (e.g., a 1 Gbps Ethernet link) with a link factor 136 of 10 and a 10 Gbps (e.g., 10 Gbps Ethernet link) with a link factor 136 of 7.

FIG. 3 is a flow chart illustrating an embodiment of a method for transmitting data across a lowest cost communications path. The method of FIG. 3 will be described as being performed by one network device 110. Each network device 110 in network 100 performs the method of FIG. 3 in one embodiment.

In FIG. 3, cost unit 130 determines a link latency 132 for each link 122(1)-122(N) as indicated in a block 302. In one embodiment, cost unit 130 executes a ping command on each link 122(1)-122(N) to determine link latencies 132. In other embodiments, cost unit 130 determines latencies 132 from information received from other network devices 110 or by accessing information stored in network device 110.

Cost unit 130 determines a cost 138 for each link 122(1)-122(N) using latencies 132 and link factors 136 as indicated in a block 304. In one embodiment, cost unit 130 multiplies a respective latency 132 by a respective link factor 136 to determine a respective cost 138 for each respective link 122(1)-122(N). For example, assume that link 122(1) has a bandwidth 134 of 155 Mbps and a latency 132 of 24 ms and link 122(2) has a bandwidth 134 of 622 Mbps and a latency 132 of 230 ms. Using the respective link factors 136 shown in FIG. 2A, cost unit 130 determines a cost 138 for link 122(1) to be 2400 (i.e., 24 times 100) and a cost 138 for link 122(2) to be 2300 (i.e., 230 times 10). In this embodiment, one or more of link factors 136 may be equal to one to cause one or more of costs 138 to be equal to one or more of the respective latencies 132. In other embodiments, cost unit 130 uses another suitable function (e.g., a multiplicative or additive function) that relates a respective latency 132 and a respective link factor 136 to determine a respective cost 138 for each respective link 122(1)-122(N).

Cost unit 130 provides costs 138 to dynamic routing protocol 126 as indicated in a block 306. Dynamic routing protocol 126 receives costs 138 for each network device 110 and generates a converged routing table 128 that identifies the lowest cost paths from the network device 110 to other network devices 110 as indicated in a block 308.

Referring to FIG. 1C, dynamic routing protocol 126 analyzes paths 142(1)-142(P), where P is greater than or equal to one, between any number of arbitrary pairs of network devices 110($i$) and 110($j$), where i and j are any integer indexes that are not equal, to identify the costs of each possible path 142. Each possible path 142 includes one of links 122($i$)(2)-122($i$)(N) and one of 122($j$)(2)-122($j$)(N) and may include any number of additional links 122 connected to intermediate network devices 110 between network devices 110($i$) and 110($j$). Where network devices 110($i$) and 110($j$) are directly connected by a single link 122, the one of links 122($i$)(2)-122($i$)(N) and the one of 122($j$)(2)-122($j$)(N) form the same link 122. Dynamic routing protocol 126 determines the cost for each path 142 to be equal to the sum of all links 122 in the path 142 in one embodiment. Dynamic routing protocol 126 identifies the lowest cost path 142 between network devices 110($i$) and 110($j$) and includes this lowest cost path in routing tables 128($i$) and 128($j$).

Network device 110 transmits data across a path 142 with the lowest cost as indicated in a block 310. In response to receiving data from link 122($i$)(1) that is destined for network device 110($j$), network device 110($i$) accesses routing table 128($i$) to determine a lowest cost path 142 to network device 110($j$) where the lowest cost path 142 includes one of links 122($i$)(2)-122($i$)(N). Network device 110($i$) transmits the received data to network device 110($j$) on the link 122($i$)(2)-122($i$)(N) that is part of the lowest cost path 142. The link 122($i$)(2)-122($i$)(N) may connect directly to network device 110($j$) or to an intermediate network device 110 between network device 110($i$) and network device 110($j$). Network device 110($j$) receives the data on a link 122($j$)(2)-122($j$)(N) that is part of the lowest cost path 142 and further transmits the data on a link 122($j$)(1).

In one embodiment, network devices 110 use the same latencies 132 and factors 136 for all links 122 to cause the cost of paths 142 to be the same in both directions between arbitrary network devices 110. By doing so, each pair of network devices 110 operates symmetrically by transferring data between the devices on the same path 142.

In other embodiments, different network devices 110 may use different latencies 132 or factors 136 to result in different lowest cost paths 142 being identified between a pair of network devices 110. Accordingly, a pair of network devices 110 may operate asymmetrically by transferring data between the devices on different paths 142 in this embodiment.

Network device 110 may include any suitable combination of hardware and software components. In one embodiment, dynamic routing protocol 126 and cost unit 130 each include a program that is stored in any suitable portable or non-portable storage medium (not shown) within or accessible to network device 110. The programs are accessible to and executable by a processor (not shown) in network device 110 to perform the functions of dynamic routing protocol 126 and cost unit 130 described above.

FIG. 4 is a flow chart illustrating an embodiment of a method for determining link factors 136 for communications links 122(1)-122(N) for a network device 110. In the method of FIG. 4, a range of cost values allowed by dynamic routing protocol 126 is determined as indicated in a block 402. A maximum link latency of all links 122(1)-122(N) is determined as indicated in a block 404.

Cost value bounds of dynamic routing protocol 126 are determined as indicated in a block 406. In one embodiment, the maximum latency determined in block 404 may be divided into the upper bound of cost values determined in block 402 to determine the upper cost value bound. The upper cost value bound may be determined in other ways in other embodiments.

Link factors 136 are determined for each link 122(1)-122(N) as indicated in a block 408. In one embodiment, link factors 136 are distributed exponentially across the set of bandwidths 134 of links 122(1)-122(N) within the cost value bounds so that the set of factors 136 has an inverse and exponential relationship with set of bandwidths 134. The set of factors 136 may be determined so that some of factors 136 cause costs 138 to favor higher bandwidths 134 over lower latencies 132 of links 122 and other factors 136 cause costs 138 to favor lower latencies 132 over higher bandwidths 134 of links 122. In other embodiments, link factors 136 may be distributed across the set of bandwidths 134 of links 122(1)-122(N) in other suitable ways.

The method of FIG. 4 may be performed automatically by a network device 110 or by an administrator of a network device 110. Where an administrator of a network device 110 performs the method of FIG. 4, the administrator may provide link factors 136 to network device 110 using any suitable interface.

The above embodiments may provide simple, straightforward, and consistent application of routing preferences in network devices 110 that scale across the full range of sizes and latencies of links 122.

Although specific embodiments have been illustrated and described herein for purposes of description of the embodiments, it will be appreciated by those of ordinary skill in the art that a wide variety of alternate and/or equivalent implementations may be substituted for the specific embodiments shown and described without departing from the scope of the present disclosure. Those with skill in the art will readily appreciate that the present disclosure may be implemented in a very wide variety of embodiments. This application is intended to cover any adaptations or variations of the disclosed embodiments discussed herein. Therefore, it is manifestly intended that the scope of the present disclosure be limited by the claims and the equivalents thereof.

What is claimed is:

1. A system comprising:
    a first network device,
    a first link and a second link to communicatively couple the first network device to a second network device, the first link having a first bandwidth and a first latency and the second link having a second bandwidth and a second latency, the second bandwidth of the second link being greater than the first bandwidth of the first link and the second latency of the second link being greater than the first latency of the first link, and
    the first network device configured to:
        determine a cost associated with the first link based on the first latency and a first factor that is a function of the first bandwidth;
        determine a cost associated with the second link based on the second latency and a second factor that is a function of the second bandwidth;
        compare the cost associated with the first link to the cost associated with the second link;
        based on comparing the cost associated with the first link to the cost associated with the second link, determine that the cost associated with the second link is lower than the cost associated with the first link; and
        transmit data to the second network device over the second link as a consequence of having determined that the cost associated with the second link is lower than the cost associated with the first link.

2. The system of claim 1 wherein the first and the second factors are inversely related to the first and the second bandwidths, respectively.

3. The system of claim 1 wherein the first network device is configured to determine the first and the second latencies.

4. The system of claim 1 wherein the data is latency sensitive data.

5. The system of claim 1 wherein the first network device is one of a router, a switch, a gateway, a firewall, and a bridge.

6. The system of claim 1 wherein the first and the second links are first and second optical links, respectively.

7. The system of claim 1 wherein:
    the first network device is configured to determine the cost associated with the first link based on the first latency and the first factor by multiplying the first latency by the first factor; and
    the first network device is configured to determine the cost associated with the second link based on the second latency and the second factor by multiplying the second latency by the second factor.

8. A method executed by a processing element, the method comprising:
    determining a first latency of a first link between a first device and a second device in a network;
    determining a second latency of a second link between the first device and the second device in the network, the second latency of the second link being greater than the first latency of the first link;
    accessing a first cost factor for the first link, the first cost factor for the first link being related to a first bandwidth of the first link;
    accessing a second cost factor for the second link, the second cost factor for the second link being related to a second bandwidth of the second link, the second bandwidth of the second link being greater than the first bandwidth of the first link;
    determining a cost associated with the first link as a function of the first latency of the first link and the first cost factor for the first link;
    determining a cost associated with the second link as a function of the second latency of the second link and the second cost factor for the second link;

comparing the cost associated with the first link to the cost associated with the second link;

based on comparing the cost associated with the first link to the cost associated with the second link, determining that the cost associated with the second link is lower than the cost associated with the first link; and transmitting data from the first device to the second device over the second link based on determining that the cost associated with the second link is lower than the cost associated with the first link.

9. The method of claim 8 wherein accessing the second cost factor includes the second cost factor being less than the first cost factor.

10. The method of claim 9 wherein:
determining the cost associated with the first link includes multiplying the first latency by the first cost factor; and
determining the cost associated with the second link includes multiplying the second latency by the second cost factor.

11. The method of claim 8 wherein transmitting data from the first device to the second device over the second link includes transmitting audio/video (A/V) media from the first device to the second device over the second link.

12. A non-transitory, computer-readable storage medium storing instructions that, when executed by a computing device, cause the computing device to:
determine a cost associated with a first link between a first network device and a second network device based on a first latency of the first link and a first factor that is related to a first bandwidth of the first link;
determine a cost associated with a second link between the first network device and the second network device based on a second latency of the second link and a second factor that is related to a second bandwidth of the second link, the second latency of the second link being greater than the first latency of the first link and the second bandwidth of the second link being greater than the first bandwidth of the first link;
compare the cost associated with the first link to the cost associated with the second link;
determine, based on having compared the cost associated with the first link to the cost associated with the second link, that the cost associated with the second link is lower than the cost associated with the first link; and
select the second link to transmit data from the first network device to the second network device as a result of having determined that the cost associated with the second link is lower than the cost associated with the first link.

13. The computer-readable storage medium of claim 12 wherein the first and the second factors are inversely related to the first and the second bandwidths, respectively.

14. The computer-readable storage medium of claim 12 further comprising instructions that, when executed by the computing device, cause the computing device to determine the first and the second latencies.

15. The computer-readable storage medium of claim 12 wherein:
the instructions that, when executed by the computing device, cause the computing device to determine the cost associated with the first link between the first network device and the second network device based on the first latency of the first link and the first factor that is related to the first bandwidth of the first link include instructions that, when executed by the computing device, cause the computing device to multiply the first latency of the first link by the first factor; and the instructions that, when executed by the computing device, cause the computing device to determine the cost associated with the second link between the first network device and the second network device based on the second latency of the second link and the second factor that is related to the second bandwidth of the second link include instructions that, when executed by the computing device, cause the computing device to multiply the second latency of the second link by the second factor.

16. A method executed by a processing element, the method comprising:
determining a first latency of a first link between a first device and a second device in a network;
determining a second latency of a second link between the first device and the second device in the network, the second latency of the second link being greater than the first latency of the first link;
accessing a first cost factor for the first link, the first cost factor for the first link being related to a first bandwidth of the first link;
accessing a second cost factor for the second link, the second cost factor for the second link being related to a second bandwidth of the second link, the second bandwidth of the second link being greater than the first bandwidth of the first link;
determining a cost associated with the first link as a function of the first latency of the first link and the first cost factor for the first link;
determining a cost associated with the second link as a function of the second latency of the second link and the second cost factor for the second link;
comparing the cost associated with the first link to the cost associated with the second link;
based on comparing the cost associated with the first link to the cost associated with the second link, determining that the cost associated with the first link is lower than the cost associated with the second link; and
transmitting data from the first device to the second device over the first link based on determining that the cost associated with the first link is lower than the cost associated with the second link.

17. The method of claim 16 wherein accessing the second cost factor includes the second cost factor being less than the first cost factor.

18. The method of claim 17 wherein:
determining the cost associated with the first link includes multiplying the first latency by the first cost factor;
determining the cost associated with the second link includes multiplying the second latency by the second cost factor.

19. The method of claim 16 wherein transmitting data from the first device to the second device over the first link includes transmitting audio/video (A/V) media from the first device to the second device over the first link.

* * * * *